United States Patent [19]

Stahel et al.

[11] 4,420,803

[45] Dec. 13, 1983

[54] HOUSING FOR FORMING A VEHICLE LIGHT ASSEMBLY

[75] Inventors: Alwin J. Stahel, St. Paul; James M. Preisler, Mound, both of Minn.

[73] Assignee: Drag Specialties, Inc., Minnetonka, Minn.

[21] Appl. No.: 392,874

[22] Filed: Jun. 28, 1982

[51] Int. Cl.[3] ...................... F21V 15/04; F21V 33/00; B60Q 1/04

[52] U.S. Cl. ...................................... 362/369; 362/61; 362/72; 362/191; 362/368; 362/375

[58] Field of Search ................ 362/72, 191, 369, 368, 362/61; 326/375

[56] References Cited

U.S. PATENT DOCUMENTS

| | | | |
|---|---|---|---|
| 2,188,623 | 1/1940 | Daehler | 362/369 |
| 2,208,154 | 7/1940 | Daehler | 362/369 |
| 3,939,339 | 2/1976 | Alphen | 362/72 |
| 4,024,387 | 5/1977 | Alphen | 362/72 |
| 4,103,323 | 7/1978 | Urbanek | 362/369 |

*Primary Examiner*—Irwin Gluck

*Attorney, Agent, or Firm*—Kinney, Lange, Braddock, Westman & Fairbairn

[57] ABSTRACT

A housing for forming a vehicle light assembly comprising a body for a light having the general shape of the rounded nose of a bullet on the back end as viewed from the side and top, a generally rectangular front end as viewed from the front and a generally arcuate lens on the front end, and a mounting base integrally formed with and on the bottom of said body whereby said body and mounting base form a housing of unitary construction which may be mounted on a vehicle.

2 Claims, 6 Drawing Figures

HOUSING FOR FORMING A VEHICLE LIGHT ASSEMBLY

BACKGROUND OF THE PRESENT INVENTION

The present invention relates to a housing for forming a vehicle light assembly and, in particular, to a housing forming a vehicle light assembly which has the mounting base integrally formed therewith on the bottom thereof and having a flat mounting surface on the lower end of said base, a threaded orifice penetrating through the lower end of said base into the housing and a hollow threaded bolt with the threaded orifice whereby the housing may be mounted to a vehicle by means of the threaded bolt.

Headlights and driving lights, in particular for vehicles such as motorcycles, come in a variety of styles and are mounted in a variety of locations on the motorcycles. Such lights generally have a parabolic shaped housing and a generally arcuate lens on the front end thereof, with a mounting bracket attached thereto usually by rivots, or by bolts, screws or other means and having an orifice therein in a convenient location by which means the light assembly can be attached to the mounting bracket for positioning in a particular location on the motorcycle.

Such construction means that if the housing is to be chromed or polished, the housing assembly and the bracket assembly must be separately chromed, which is expensive, and then additional parts and assembly of the parts is involved, which increases parts cost and labor cost.

SUMMARY OF THE PRESENT INVENTION

The present invention provides a housing for a vehicle light assembly which is of unitary construction and has the base incorporated as an integral part of the housing, thus requiring no extra parts and no assembly of parts and thus saves labor and parts cost since the unitary design allows the unit to be plated, finished and polished in one operation. Further, no labor is required to assemble additional parts as in the prior art assemblies.

Thus, the present invention relates to a housing for forming a vehicle light assembly comprising a body for a light having the general shape of the rounded nose of a bullet on the back end as viewed from the side and top, a generally rectangular front end and as viewed from the front and a generally arcuate lens on the front end and a mounting base integrally formed with and on the bottom of said body whereby said body and mounting base form a housing of unitary construction which may be mounted on a vehicle.

BRIEF DESCRIPTION OF THE DRAWINGS

These and more detailed objects and advantages of the present invention will be disclosed in the course of the following specification, reference being had to the accompanying drawings, in which.

DETAILED DESCRIPTION OF THE DRAWINGS

Figure 1:
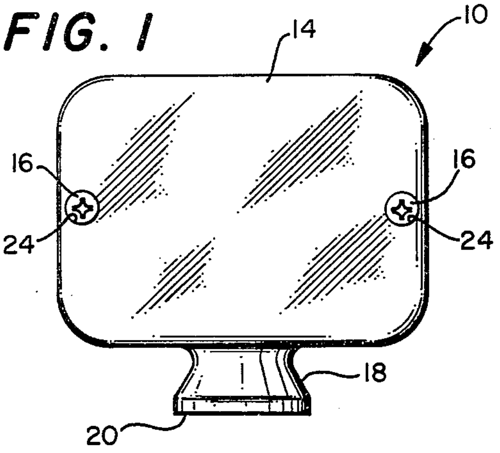
FIG. 1 is a front view of the novel light assembly housing.

FIG. 1 is the front view of the novel light assembly housing of the present invention and illustrates the light assembly generally by the numeral 10, and includes the housing on body 12 with a generally rectangular lens 14 attached on the front end thereof by means of screws or other fastening devices 16. A base 18 is integrally formed with said body 12 and is located on the bottom thereof and has a flat mounting surface 20 on the lower end of said base 18 whereby said unit may be mounted on any flat surface. As will be pointed out more clearly with respect to FIG. 4, an orifice exists in mounting base 18 and extends through the flat mounting surface 20 internally to the inside of housing or body 12. The orifice is threaded whereby a bolt may mate therewith and hold said body 12 to any surface upon which it is mounted.

Figure 2:
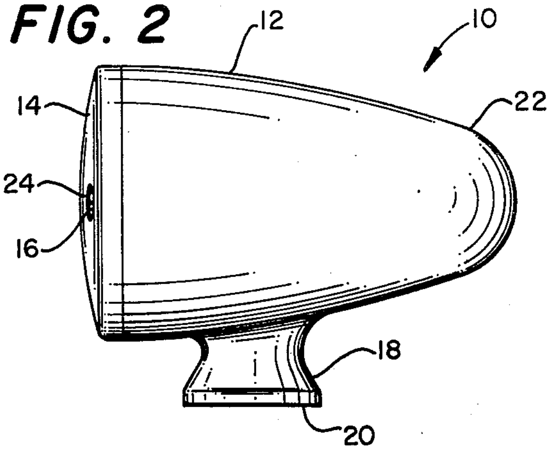
FIG. 2 is a side view of the novel housing.

FIG. 2 is a side view of said light assembly and, again, the assembly is designated generally by the numeral 10. It can be seen that the body 12 is generally in the shape of the rounded nose of a bullet on the back end 22 thereof as viewed from the side or top, and has a generally rectangular front end as viewed from the front and lens 14 is of a generally arcuate shape and mounted on the front end by means of screws 16 through orifices 24 as shown in FIG. 1. Again, it will be seen that base 18 with the flat mounting surface 20 on the lower end thereof is integrally formed with body 12 and does not require any additional mounting brackets or parts other than the fastening bolt.

Figure 3:
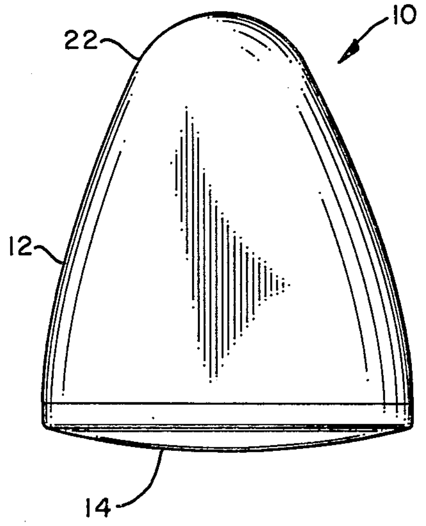
FIG. 3 is a top view of the novel housing.

FIG. 3 is a top view of the light assembly housing and again includes the body 12 having the generally arcuate lens 14 attached to the front end thereof. Again, it will be seen that the back end of the body as viewed from the top is in the general shape of the rounded nose of a bullet.

Figure 4:
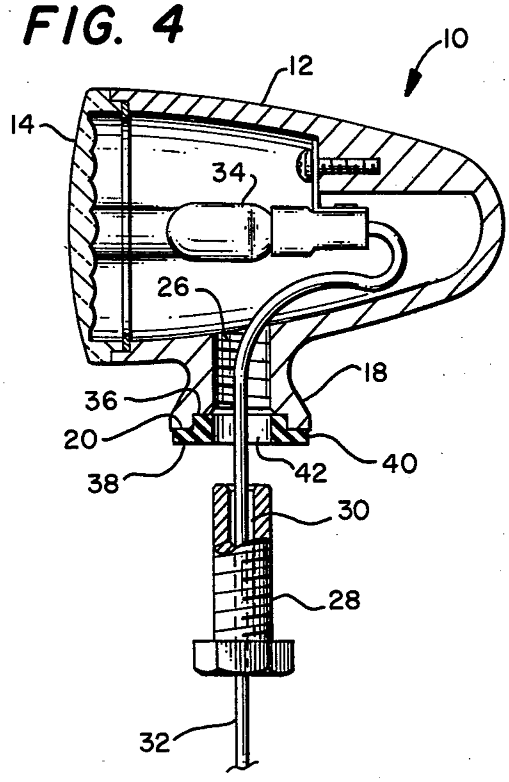
FIG. 4 is a cross-sectional view of the novel housing illustrating the unitary construction of the base and the housing assembly.

FIG. 4 is a cross-sectional view of the housing assembly which is again designated generally as the numeral 10. It can be seen clearly in FIG. 4 that body 12 and mounting base 18 are of unitary construction and integrally formed and provide a unitary housing assembly. It will be noted that a threaded orifice 26 penetrates through the lower end 20 of said base 18 into said body 12. Further, a threaded bolt 28 for mating with the threaded orifice 26 is provided whereby the body 12 may be mounted to a vehicle or other object by means of said bolt. An orifice 30 extends longitudinally through said threaded bolt 28 and an electrical conductor 32 extends through said longitudinal orifice 30 in said bolt into the inside of body 12 and is connected to a light source 34 which may be a conventional light bulb for providing power thereto. It will be noted that an annular recess 36 is formed about said threaded orifice 26 in said base 18 and a shock mount 38 is positioned in and mates with said annular recess 36 and has a horizontal flange 40 which extends over the flat mounting surface 20 on the lower end of said base 18 and acts as a shock absorber. The shock mount 38 may be formed of a resilient material such as rubber. Such mount will not only serve as a shock absorber but also as a seal to keep moisture out of the inside of said body 12.

Figure 5:
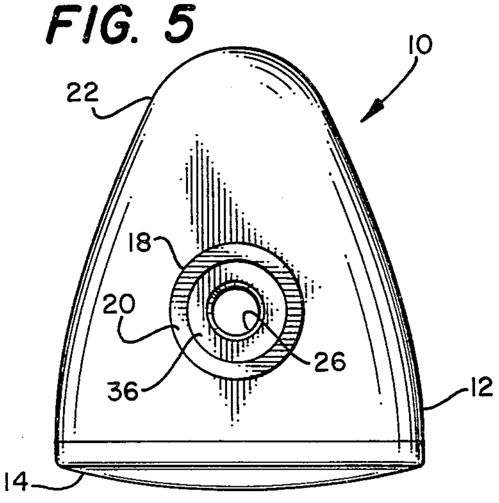
FIG. 5 is a bottom view of the novel housing assembly.

FIG. 5 is a bottom view of the novel housing assembly 10 and illustrates once again the general shape of the rounded nose of a bullet on the back end 22 as viewed from the bottom and the generally arcuate shaped lens 14 on the front end thereof. Base 18 has threaded orifice 26 penetrating through the lower end 20 of said base 18 into said body 12 and annular recess 36 formed about said threaded orifice 26 in said base 18 for receiving the shock mount 38 shown in FIG. 4 and FIG. 6.

Figure 6:
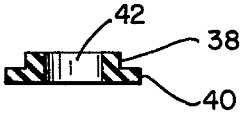
FIG. 6 is a cross-sectional view of a shock mount which may be positioned in and mate with the base of said light assembly.

FIG. 6 illustrates a cross-sectional view of the shock mount 38 and illustrates orifice 42 through which the electrical conductor 32 shown in FIG. 4 will pass to enter the inside of housing 12. As can be seen in FIG. 6, shock mount 38 has a horizontal flange 40 which extends over the flat mounting surface 20 on the lower end of base 18 to act as the shock absorber and seal.

Thus, a novel housing for forming a vehicle light assembly has been disclosed which is of unitary construction and in which the base is integrally formed therewith thereby enabling the unit to be plated, finished and polished in one operation and which is both economical and labor saving in that no additional parts need be handled or assembled.

While the invention has been described in connection with a preferred embodiment, it is not intended to limit the scope of the invention to the particular form set forth, but, on the contrary, it is intended to cover such alternatives, modifications, and equivalents as may be included in the spririt and scope of the invention as defined by the appended claims.

What is claimed is:

1. A vehicle light assembly comprising:

(a) an integral body having a top surface, a bottom surface, side surfaces, a closed back end, an open front end, an interior chamber, a mounting base with a flat mounting surface on the lower end extending downward from the bottom surface, and a single threaded orifice extending through the base to the chamber;

(b) a generally arcuate light transmitting lens mounted to the front end of the body to close the interior chamber;

(c) an electrical light source mounted to the body within the chamber and positioned so that light emitted by the electrical light source is directed out of the chamber through the lens;

(d) threaded mounting means constructed and arranged for engagement with the threaded orifice in the mounting base to permit mounting of the body to a vehicle, the bolt having a head, a threaded shank and an orifice extending longitudinally through the mounting means; and (e) an electrical conductor connected at one end to the light source and extending out of the chamber through the orifice in the mounting means for permitting electrical power to be provided to the light source.

2. The vehicle light assembly as in claim 1 further including:

(a) an annular recess formed about the threaded orifice in the lower end of the base, and (b) a resilient shock mount positioned in and mating with the annular recess and having a horizontal flange extending over the flat mounting surface on the lower end of the base to act as a shock absorber and a seal.

* * * * *